United States Patent [19]

Mizusawa et al.

[11] Patent Number: 5,598,402
[45] Date of Patent: Jan. 28, 1997

[54] MULTIPLEXER WITH TRANSMISSION BACK-UP FUNCTION

[75] Inventors: Tunetoshi Mizusawa, Tokyo; Masahiko Saito, Shizuoka, both of Japan

[73] Assignee: NEC Corporation, Japan

[21] Appl. No.: 493,133

[22] Filed: Jun. 21, 1995

[30] Foreign Application Priority Data

Jun. 22, 1994  [JP]  Japan ................................ 6-140376

[51] Int. Cl.⁶ .................................. H04J 3/22; H04L 1/22
[52] U.S. Cl. ...................... 370/225; 395/181; 370/465; 370/535; 370/385
[58] Field of Search .......................... 370/16, 16.1, 54, 370/55, 56, 58.1, 58.2, 58.3, 68, 68.1, 79, 84, 85.1, 85.7, 85.9, 110.1, 112; 379/219, 220, 221, 268, 269, 271, 272, 273, 279; 395/180, 181, 182.01, 182.02; 340/825.01, 825.03, 826, 827

[56] References Cited

U.S. PATENT DOCUMENTS

| | | | |
|---|---|---|---|
| 5,263,017 | 11/1993 | Nakajima et al. | 370/16 |
| 5,440,564 | 8/1995 | Ovada et al. | 370/112 |
| 5,442,622 | 8/1995 | Hokari | 370/16 |
| 5,452,286 | 9/1995 | Kitayama | 370/16 |

*Primary Examiner*—Alpus H. Hsu
*Attorney, Agent, or Firm*— Ostrolenk, Faber, Gerb & Soffen, LLP

[57] ABSTRACT

Multiplexer/de-multiplexer units 201 to 296 directly multiplexes or de-multiplexes data signals from terminals. A leased line allotting unit 20 normally allotting all time slots on a multiplexed signal bus 25 to the side of a high rate 6 Mbps digital leased line 3. Switched line allotting units 21 to 24 execute allotting, in the event of a trouble in the leased line, the multiplexed signal time slots on the multiplexed signal bus in four divisions to the side of respective 1.5 Mbps switched lines 41 to 44 through transmission rate conversion. A control unit executes a time slot allotting change.

4 Claims, 4 Drawing Sheets

MULTIPLEXER WITH TRANSMISSION BACK-UP FUNCTION

BACKGROUND OF THE INVENTION

The present invention relates to a multiplexer with transmission line back-up function and, more particularly, to a multiplexer, which uses as its transmission line, i.e., as normal transmission line, a leased line and also use as a back-up line a parallel connection of a plurality of switched lines.

In prior art multiplexer of this type, high speed digital leased lines of high speed digital lines for internal communication in projects, have been used as transmission line. To enhance the reliability of the line, a back-up line is usually provided. Sometimes, a separate leased line is employed as the back-up line. However, it is uneconomical to employ the high fee leased line for the back-up purpose. Recently, therefore, use is made of economical ISDN switched line services. For the ISDN services, several interface menus are prepared. Among these interface menus, the highest speed one is for PCM primary speed group interfaces (called "ISDN Network 1500"). Thus, where a 6 Mbps band high speed digital leased line is used as the normal transmission line for multiplexed signal, for lines of the 1.5 Mbps "ISDN network 1500" are used for the back-up.

A prior art multiplexer system is shown in the block diagram of FIG. 4. Each multiplexer 5 comprises four 1.5 Mbps multiplexer units 51 to 54 for multiplexing and de-multiplexing twenty four 64 kbps channels to and from 1.5 Mbps band, and a 6 Mbps multiplexer unit 50 for multiplexing and de-multiplexing four primary group multiplexed signals from the 1.5 Mbps multiplexer units 51 to 54 to and from 6 Mbps secondary group multiplexed signals. Stations A and B each with the above multiplexer 5 installed therein, are connected to each other by a 6 Mbps high speed digital leased line 3 as the normal transmission line or by an ISDN switched network 4 as back-up line, the ISDN network 4 being constituted by four 1.5 Mbps switched lines 41 to 44 in parallel connection.

The leased and switched lines are four-line bi-directional lines. To the channel side of each multiplexer 5 are connected at most ninety six terminals 101 to 196. By the term "terminal" used in this specification is meant a terminal in a wise sense, covering various data terminals, host computers, FAX sets, telephone sets, video terminals, etc.

In the instant system, the 6 Mbps high speed digital leased line as the normal transmission line is normally used for communication via the 6 Mbps multiplexers 50. However, when the 6 Mbps multiplexer 5 in, for instance, the station A detects a trouble in signal received from the 6 Mbps high speed digital leased line 3, a leased line trouble signal (not shown) is issued to the 1.5 Mbps multiplexer units 51 to 54. In response to this signal, each 1.5 Mbps multiplexer unit sends a calling signal (not shown) to the side of the ISDN switched network 4 for line connection to the side of the station B.

Thus, the transmission line is switched to the side of the 1.5 Mbps switched lines 41 to 44 for back-up in primary group units of 1.5 Mbps. Meanwhile, in the station B the individual 1.5 Mbps multiplexer units 51 to 54 receive a called signal (not shown) accompanying the line connection from the ISDN switched network 4, whereby the transmission line is switched over to the 1.5 Mbps switched line side for back-up. In the above way, the back-up switching of the transmission line is realized.

In this prior art example, as described above, the multiplexing is performed first by the 1.5 Mbps multiplexer units for connection to the switched network for the back-up line and then by the 6 Mbps multiplexer unit for connection to the 6 Mbps leased line as the normal transmission line. That is, the multiplexing is performed in two stages, thus leading to high system equipment cost.

In addition, depending on the traffic, there are unnecessary channels for any back-up so that it is desired to reduce the 1.5 Mbps lines to three lines. In this case, it is necessary to switch channels which need back-up and those which do not, which leads to the necessity of changing the wiring from the terminal. Further, if it is desired to replace the 1.5 Mbps switched lines with 384 kbps switched lines as the back-up line, it is necessary to change the system equipment, thus giving rise to extra expenses. That is, such back-up line change dictates hardware change, requiring man-hour and extra expenses. In other words, the coping property in such case is unsatisfactory. Further, in recent multiple media multiplexers it is impossible to cope with such cases as when it is to provide the back-up in units of 6 Mbps multiplexed signals.

SUMMARY OF THE INVENTION

According to one aspect of the present invention, there is provided a multiplexer with transmission line back-up function comprising a multiplexer part for converting data signals from a plurality of terminals into a multiplexed signal and switching a transmitting side transmission line such that all time slots of the multiplexed signal are normally allotted to the side of a leased transmission line prepared for normal transmission line and allotted, in the event of a trouble in the leased transmission line, to the side of a plurality of parallel switched lines prepared for a back-up, and a de-multiplexer part for switching a receiving side transmission line in correspondence to the multiplexer part and de-multiplexing multiplexed signal after the switching of the transmission line into a plurality of data signals sent to the terminal side.

According to another aspect of the present invention, there is provided a multiplexer with transmission back-up function comprising: a plurality of multiplexer/de-multiplexer units for directly multiplexing and de-multiplexing; a multiplexed signal bus for transmitting multiplexed signals; a leased line allotting unit for undertaking allotting of all the time slots of the multiplexed signal bus to a digital leased line 3 and also converse allotting; and a plurality of switched line allotting units for undertaking, in the event of a trouble in the leased line, allotting of all the time slots of the multiplexed signal bus to a plurality of switched lines by dividing the time slots into a plurality of time slots and also allotting in the transmitting direction.

Other objects and features will be clarified from the following description with reference to attached drawings.

DETAILED DESCRIPTION OF THE EMBODIMENTS

Figure 1:
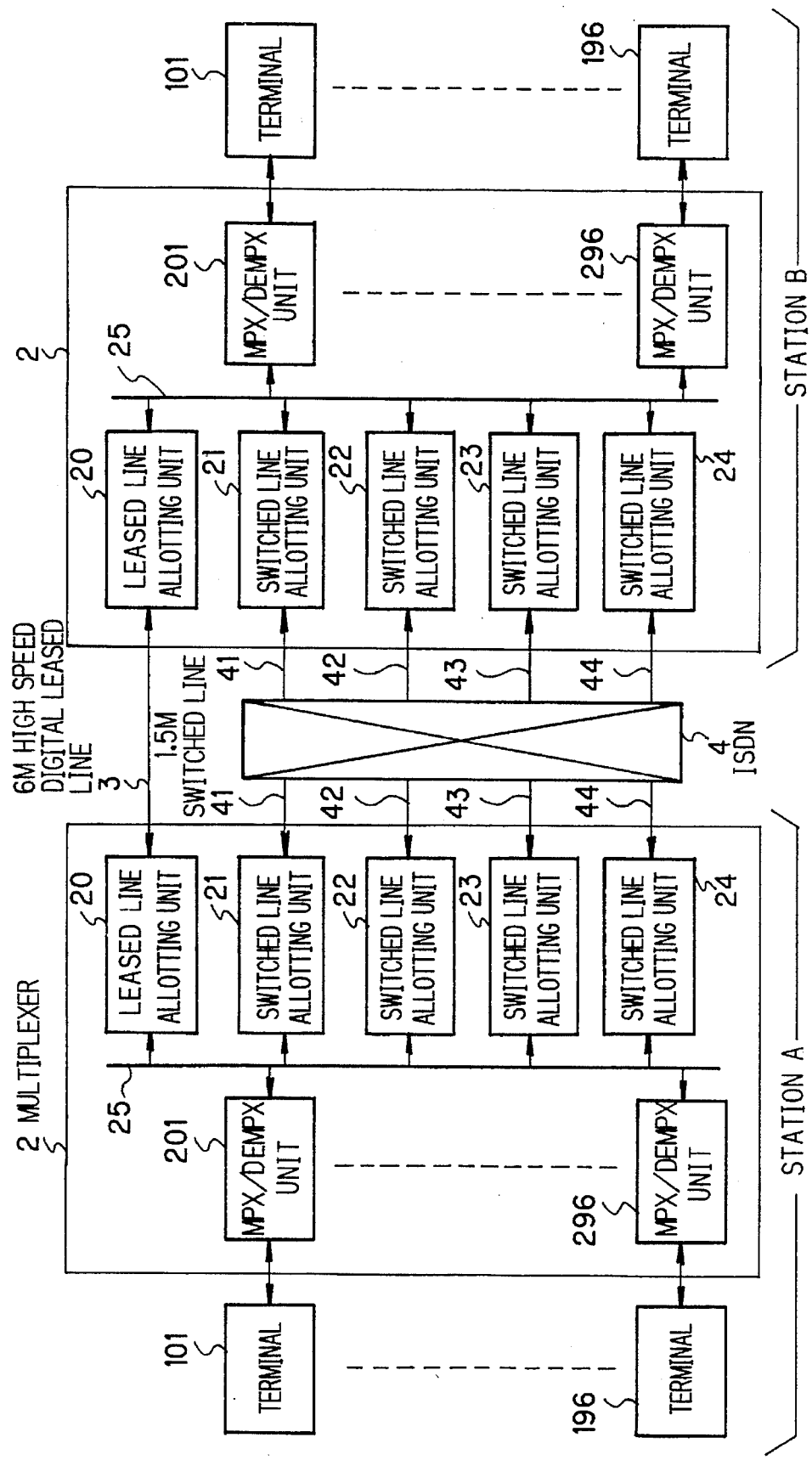
FIG. 1 shows a block diagram of a multiplexer system according to the present invention.

An embodiment of the system according to the present invention is shown in FIG. 1. Multiplexer 2 comprises ninety six multiplexer/de-multiplexer units 201 to 296 for directly multiplexing and de-multiplexing 64 kbps channels to and from 6 Mbps band.

Multiplexed signals are transmitted via a multiplexed signal bus 25. The multiplexer further comprises a leased line allotting unit 20 and four switched line allotting units 21 to 24. The leased line allotting unit 20 undertakes allotting of all the time slots (i.e., all the channels) of the multiplexed signal bus 25 to a 6 Mbps digital leased line 3 and also converse allotting. In the event of a trouble in the leased line 3, the switched line allotting units 21 to 24 undertakes allotting of all the time slots of the multiplexed signal bus 25 to 1.5 Mbps switched lines 41 to 44 by dividing the time slots into four time slots and also allotting in the transmitting direction. Stations A and B each with the multiplexer 2 installed therein, are connected to each other by a 6 Mbps high speed digital leased line (hereinafter referred to as 6 Mbps leased line) 3 as the normal transmission line or by four parallel 1.5 Mbps switched lines 41 to 44 of ISDN switched network 4 as the back-up line. The leased and switched lines are four-line type bi-directional lines. To the channel side of each multiplexer 2 are connected ninety six terminals 101 to 196. By the term "terminal" is meant a terminal in a broad sense, covering various data terminals, host computers, FAX sets, telephone sets, video terminals, etc.

In this system, normally the multiplexed signals on the multiplexed signal bus 25 are allotted for communication to the 6 Mbps leased line 3 as the normal transmission line. When the leased line allotting unit 20 in the multiplexer 2 on the side of, for instance, the station A detects a reception trouble in the leased line, a leased line trouble signal (not shown) is output to the switched line allotting units 21 to 24.

As a result, each switched line allotting unit sends out a calling signal (not shown) to the side of the ISDN switched network 4 for line connection to the side of the station B. Thus, the allotting of the multiplexed signals on the multiplexed signal bus 25 is switched from the side of the 6 Mbps leased line 3 over to the side of the switched lines 41 to 44.

Meanwhile, in the station B the switched line allotting units 21 to 24 in the multiplexer 2 switch the allotting of the signals on the multiplexed signal bus 25 according to a called signal (not shown) that is received with the line connection. In this way, the back-up switching of the transmission line is realized. The switching operation will be described later in detail with reference to FIG. 3.

Figure 2:
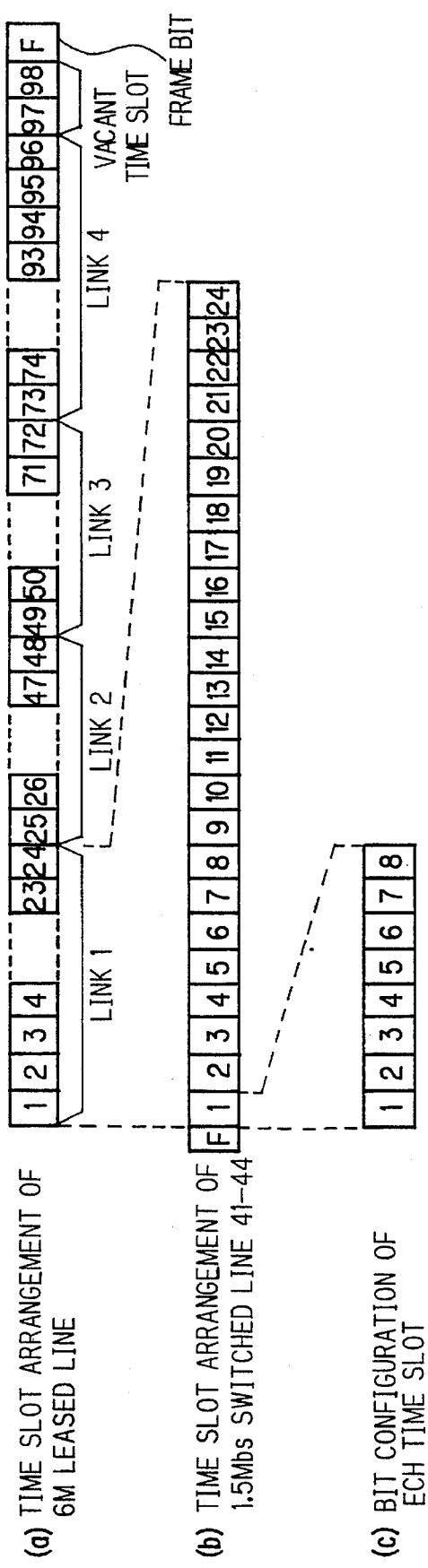
FIG. 2 shows the frame configuration of multiplexed signal time slot arrangement on each transmission side in FIG. 1.

FIG. 2 shows the frame configuration of multiplexed signal time slot arrangement on each transmission side in FIG. 1. FIG. 2(a) shows signal on the 6 Mbps leased line 3. This arrangement comprises time slots 1 to 96 for accommodating ninety six 64 kbps channels, vacant time slots 97 and 98 for accommodating a calling signal or the like, and a synchronizing frame bit F. The time slots 1 to 96 are divided into four links 1 to 4 each of twenty four slots for the 1.5 Mbps switched lines. FIG. 2(b) shows a signal on each 1.5 Mbps switched line. This signal comprises twenty four slots 24 constituting one link and one added frame bit F. It is allotted to each of the 1.5 Mbps switched lines 41 to 44. FIG. 2(c) shows the bit configuration of each time slot (or channel), comprising eight bits.

Figure 3:
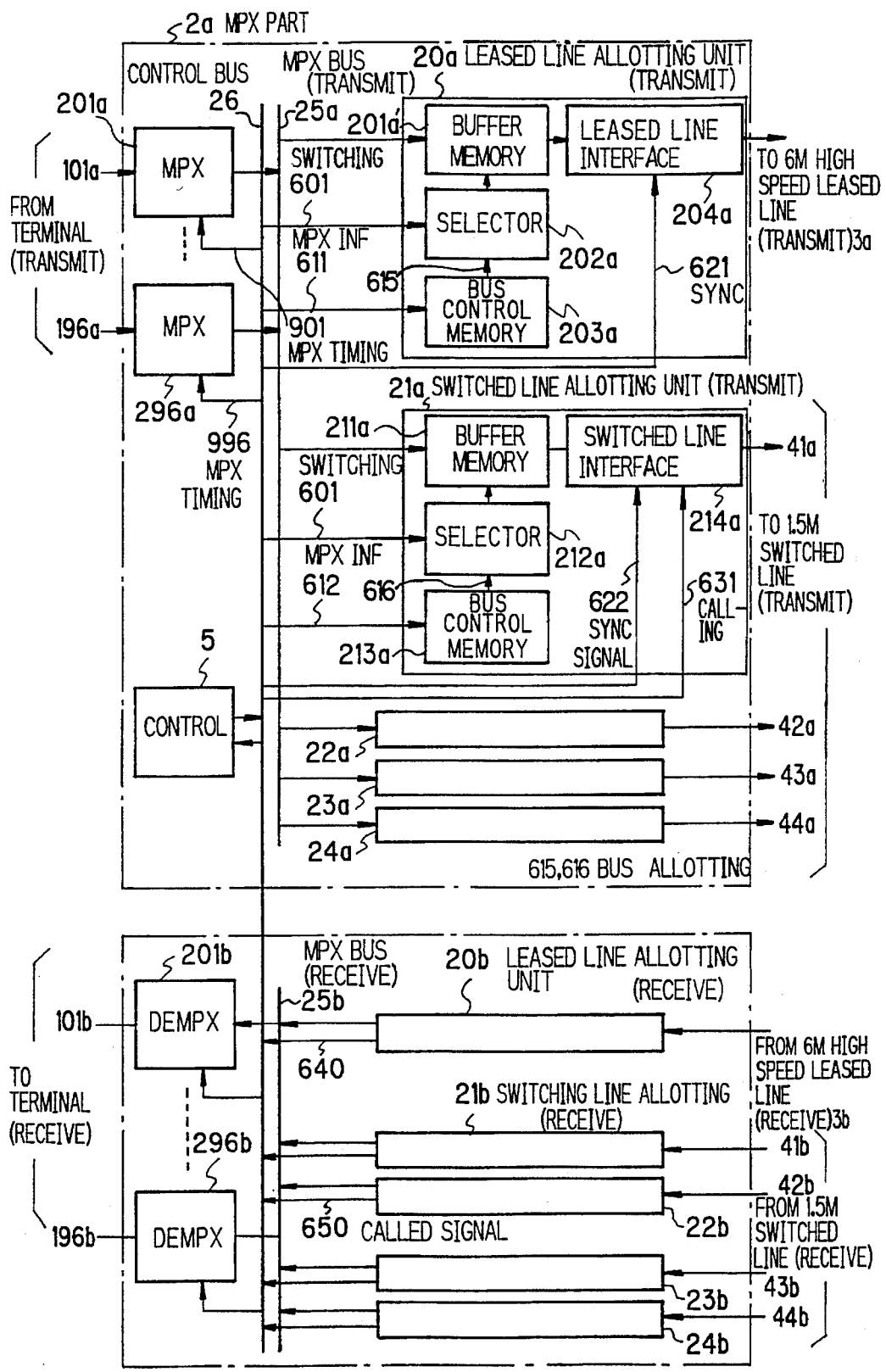
FIG. 3 shows a block diagram showing the internal structure of each multiplexer 2 shown in FIG. 1.
Figure 4:
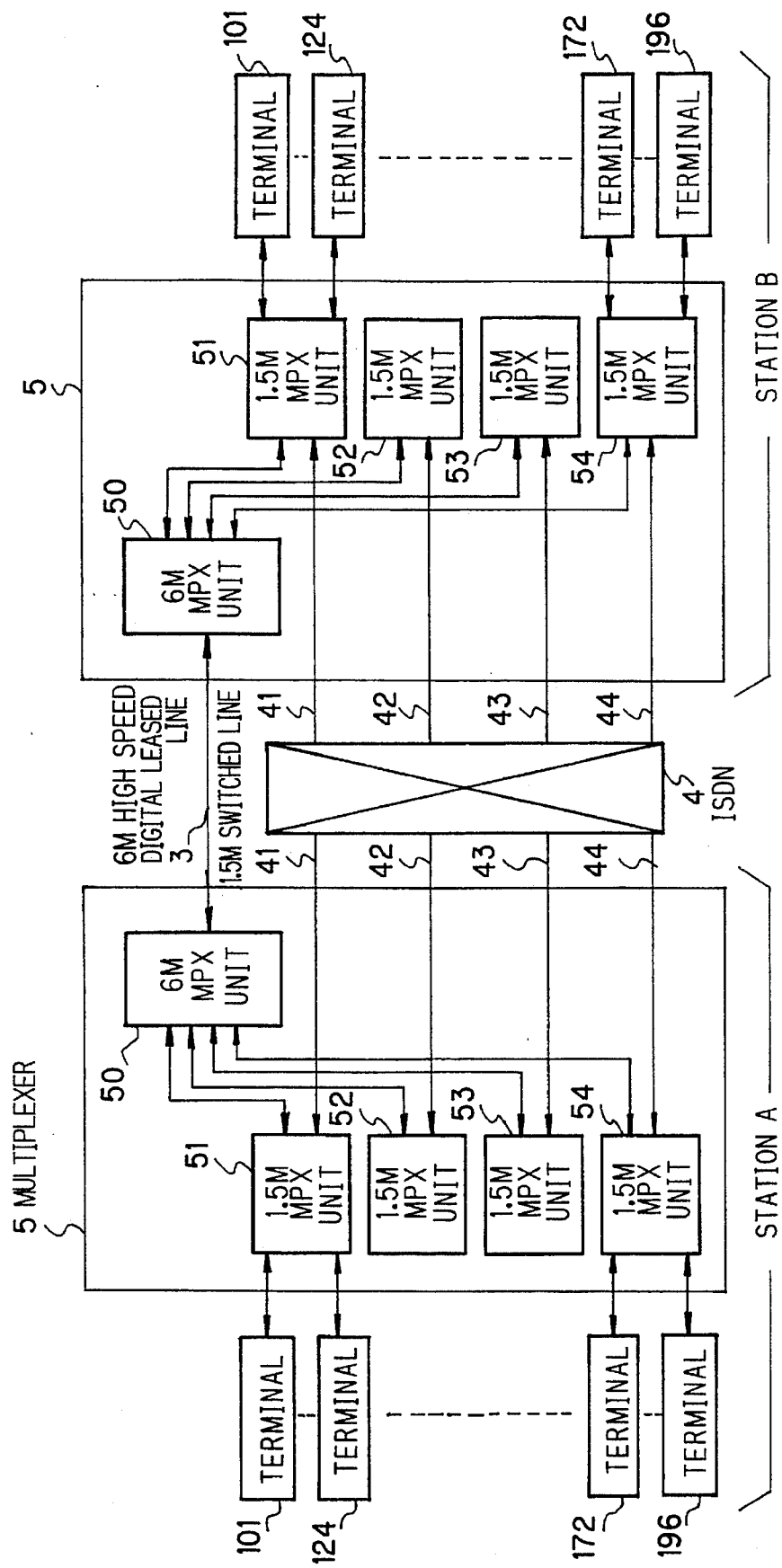
FIG. 4 shows a block diagram of a prior art multiplexer system.

Now, specific construction and operation of the embodiment will be described with reference to FIG. 3. FIG. 3 is a block diagram showing the internal structure of each multiplexer 2 shown in FIG. 1. In the Figure, a multiplexer part 2a on the transmitting side and a de-multiplexer 2b on the receiving side, of the multiplexer 2, are shown separately with respect to the transmission line. The internal structure of the de-multiplexer part 2b corresponds to that of the multiplexer part 2a, so its detailed showing is omitted. In the multiplexer unit 2a, data signals from the ninety six terminals (transmitting terminals) 101a to 196a are converted in multiplexer units 201a to 296a according to corresponding multiplexing timing signals 901 to 996 into multiplexed signal sent to a multiplexed signal bus (transmitting bus) 25a.

Normally, all the time slots of the multiplexed signal bus (transmitting bus) 25a are allotted by a leased line allotting unit (transmitting unit) 20a to a 6 Mbps leased line (transmitting line) 3a. Meanwhile, the vacant line slots are allotted by switched line allotting units (transmitting units) 21a to 24a to 1.5 Mbps switched lines (transmitting lines) 41a to 44a. (That is, the allotting is stopped.)

The leased line allotting unit (transmitting) 20a includes a bus control ACM (address control memory) 203a, a selector circuit 202a, a buffer memory 201a' and a leased line interface unit 204a. The bus control memory 203a receives multiplexing information 611 from a control bus 26 and holds a bus allotting signal 615 for allotting all the time slots of the multiplexed signal bus (transmitting) to the leased line side.

The selector circuit 202a normally reads out and outputs the bus allotting signal 615. When it receives a switching signal 601, it outputs a vacant bus allotting signal (i.e., a signal of logic value "0") for allotting all the time slots to the vacant state. The buffer memory 201a' outputs all the time slot signals of the links 1 to 4 shown in FIG. 2, on the multiplexed signal bus (transmitting) 25a, as read-out leased line multiplexed signal according to the output signal of the selector circuit 212a. The leased line interface unit 204a converts the signal format to one on the leased line side by inserting a sync signal 621 in the F bit shown in FIG. 2, of the leased line multiplexed signal or inserting a control signal in signal TS and sends out the converted format to the side of the 6 Mbps leased line (transmitting).

The switched line allotting units (transmitting) 21a to 24a each includes a bus control memory (address control memory) 213a, a selector circuit 212a, a buffer memory 211a and a switched line interface unit 214a. The bus control memory 213a receives multiplexing information from the control bus 26 and holds a bus allotting signal 616 for allotting a predetermined link among the time slots on the multiplexed signal bus (transmitting) 25a to each of the 1.5 Mbps switched lines 41a to 44a. The selector circuit 212a reads out and outputs the bus allotting signal 616 when it receives the switching signal 601. Normally, it outputs a vacant bus allotting signal (i.e., signal of logic value "0") for allotting each time slot in the vacant state.

The buffer memory 211a reads out the time slot signals on the multiplexed signal bus 25a at the switched line side transmitting speed, i.e., at 1.5 Mbps, and outputs these signals as switched line multiplexed signal according to the output signal of the selector circuit 212a. The switched line interface unit 214a inserts a sync signal 622 and a calling signal 631 for line connection control in the switched line multiplexed signal. It also converts the switched line side signal format. It transmits the result to the side of the corresponding 1.5 Mbps switched lines (transmitting) 41a to 44a.

A control unit 5 generates various multiplexing control signals to be supplied via the control bus 26 to various parts of the circuitry. More specifically, it receives an internally generated clock signal 900, a receiving clock signal (not shown) extracted from the received multiplexed signal on the side of the de-multiplexer unit 26 and a received sync signal (not shown), and outputs multiplexing timing signals 901 to 996, multiplexing signals 611 and 612 and sync signals 621 and 622.

Further, in the event of a leased line trouble, that is, upon detection of the departure from the synchronism of received multiplexed signal, or the exceeding of a reference error factor, etc., a leased line trouble signal 640 is issued to the leased line allotting unit (receiving) 20b of de-multiplexer part 26. Thus, the leased line allotting unit 20b outputs a switching signal 601 and a calling signal 631. Further, when the switched line allotting units (receiving) 21b to 24b of the de-multiplexer part 26 receive a called signal 650 output upon reception of a calling signal 631 from the transmitting side, they output switching signals 601 and 602.

In the above described structure, the multiplexed signal on the multiplexed signal bus (transmitting) 25a of the multiplexer part 2a on the transmitting side is normally sent to the 6 Mbps leased line (transmitting) 3a. However, when the leased line gets into a trouble, the line is switched over to the side of the 1.5 Mbps switched lines (transmitting) 41a to 44a by the switching signal 601. Further, the de-multiplexer part 2b on the receiving side, although its internal structure is not shown, constitutes a de-multiplexing circuit corresponding to the multiplexer part 2a. Its transmission line switching is performed in synchronism to the multiplexing side.

In the above embodiment, the transmission line is provided as a combination of a 6 Mbps leased line and four 1.5 Mbps switched lines. However, if it is desired to construct the back-up line with one less, i.e., three, 1.5 Mbps switched lines, or if it is desired to construct the back-up line with 384 kbps switched lines in lieu of the 1.5 Mbps switched lines, it may be easily attained by changing the combination of the selected time slots and the bus allotting signal 616 for selecting time slots on the multiplexed signal bus 25 for allotment. The bus allotting signal may be changed by merely changing software for changing the data in the bus control memory.

Further, the transmission speed of each transmission line or data signal speed on the terminal side may be changed without changing the structure but by merely changing part of the control unit 5 or bus control ACMs 203 and 213.

As has been described in the foregoing, with the multiplexer having transmission line back-up function according to the invention, where a plurality of parallel low speed switched circuits are used as the back-up line for high speed digital leased line as the normal transmission line, the multiplexer directly multiplexes terminal side data signal into high speed leased line side multiplexed signal. Thus, compared to the two-stage multiplexing case, the system structure can be simplified, and the entire system can be made more economical and more reliable.

Further, the line switching is made by changing the allotting of multiplexed signal time slots according to the line configuration. Thus, the back-up line configuration may be changed with a mere simple software change of changing bus allotting signal data. In other words, a back-up line change may be coped with promptly and without need of substantial expenses.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A multiplexer with transmission line back-up function, comprising:

a multiplexer part for converting the data signals from a plurality of terminals into a multiplexed signal and switching a transmitting side transmission line such that all time slots of the multiplexed signal are normally allotted to the side of a leased transmission line prepared for normal transmission line and allotted, in the event of a trouble in the leased transmission line, to the side of a plurality of parallel switched lines prepared for back-up, and a de-multiplexer part for switching a receiving side transmission line in correspondence to the multiplexer part and de-multiplexing multiplexed signal after the switching of the transmission line into a plurality of data signals sent to the terminal side;

the multiplexer part includes:

a plurality of multiplexer units for allotting the plurality of data signals to predetermined time slots of the multiplexed signal according to respectively corresponding multiplexing timing signals;

a multiplexed signal bus for transmitting the multiplexed signal to various parts in the system, a leased line bus control address control memory for receiving multiplexing information and holding a leased line allotting signal for allotting all the time slots on the multiplexed signal bus to the leased line side;

a leased line switching circuit normally outputting the leased line bus allotting signal and switching the same signal according to a switching signal to a vacant bus allotting signal for allotting all the time slots on the multiplexed signal bus in the vacant state, a leased line buffer memory for receiving the multiplexed signal bus time slot signals according to an output signal of the leased line switching circuit and outputting the received signals as a leased line multiplexed signal;

a leased line interface unit sending out the converted signal format to the leased line side and converting a signal format by inserting a leased line sync signal in the leased line multiplexed signal;

a plurality of bus control address control memories for receiving the multiplexing information and holding a switched line bus allotting signal for allotting the multiplexed signal bus time slots dividedly to the corresponding switched lines;

a plurality of switched line switching circuits for outputting the switched line allotting signal according to the switching signal and normally outputting a vacant bus allotting signal for allotting the multiplexed signal bus time slots in the vacant state;

a plurality of switched line buffer memories for receiving the multiplexed signal bus time slot signals according to an output signal for the switched line switching circuit for conversion to a corresponding switched line side transmission speed to output as switched line multiplexed signal;

a plurality of switched line interface units for converting the signal format by inserting a switched line sync signal and a calling signal for line connection control in the switched line multiplexed signal and then sending the converted signal form to the corresponding switched line side;

a control unit for outputting the multiplexing timing signal, the multiplexing information, the leased line sync signal and the switched line sync signal by receiving a clock signal generated in the system, a received clock signal extracted in the de-multiplexer part and a received sync signal, outputting the switching signal and the calling signal by receiving a leased line trouble signal issued in the event of trouble in the leased line, and outputting the switching signal by receiving a calling signal output when the calling signal is received in the de-multiplexer part; and a control bus for transmitting various input and output signals to and from the control unit to various parts in the system.

2. The multiplexer with transmission back-up function as set forth in claim 1, wherein as the leased line is used a 6 Mpbs high speed digital line, and as the switched lines are used four 1.5 Mbps lines.

3. The multiplexer with transmission back-up function as set forth in claim 1, wherein as the leased line is used a 6 Mpbs high rate digital line, and as the switched lines are used four 1.5 Mbps lines.

4. The multiplexer with transmission back-up function as set forth in claim 1, wherein the trouble is a departure from the synchronism of the received multiplexed signal, or the exceeding of a reference error factor.

* * * * *